ENGINE-DRIVEN FLYBALLS

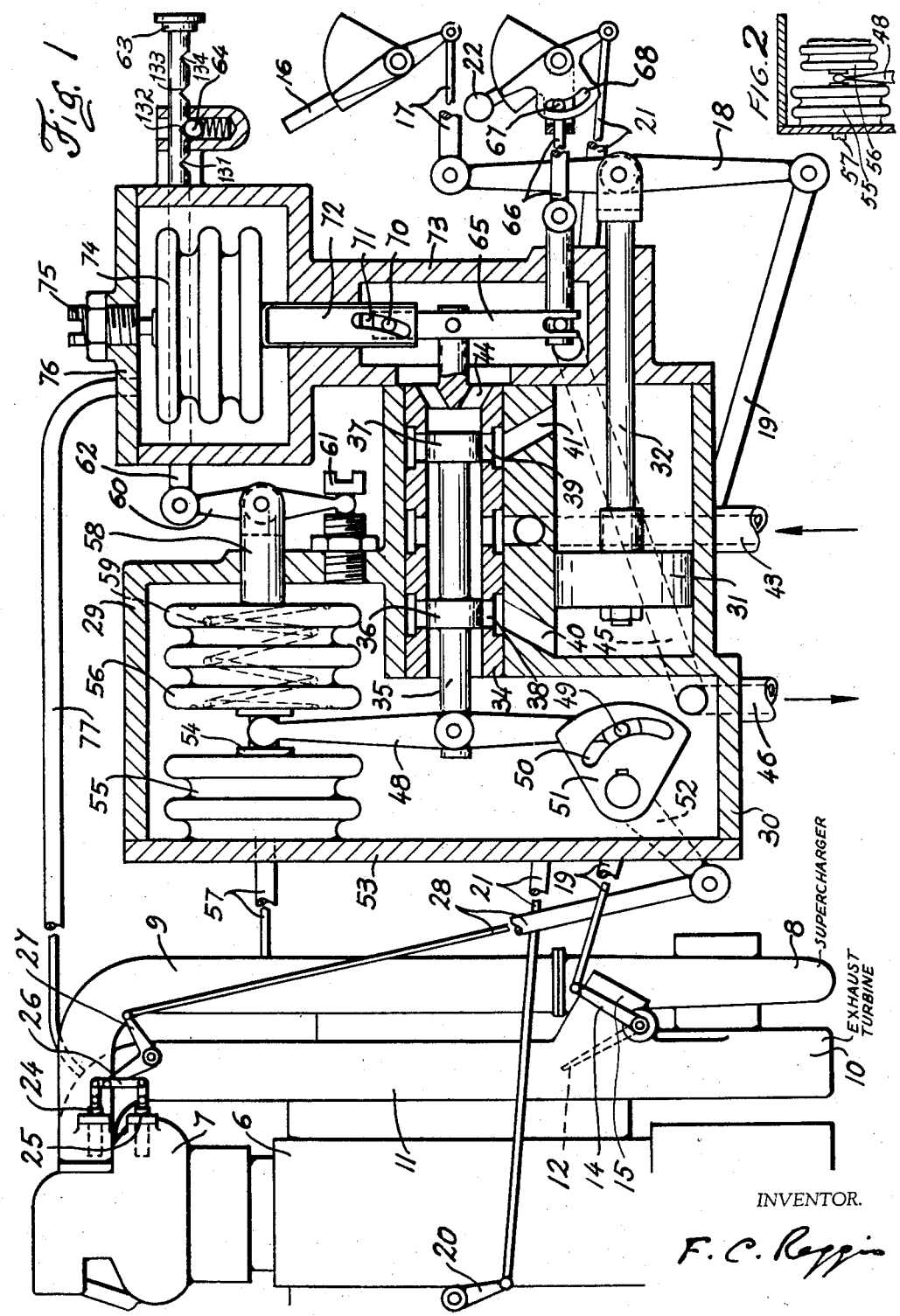

INVENTOR.

F.C. Reggio

United States Patent Office 2,901,885
Patented Sept. 1, 1959

2,901,885
POWER PLANT SPEED AND TEMPERATURE CONTROL

Ferdinando Carlo Reggio, Norwalk, Conn.

Original application December 15, 1941, Serial No. 423,001. Divided and this application April 25, 1955, Serial No. 503,576

10 Claims. (Cl. 60—13)

This invention relates to improved engine regulating devices and has particular reference to power control apparatus for automotive and aircraft powerplants.

The present application is a division of my copending application Serial No. 423,001, filed December 15, 1941, now abandoned.

An object of the invention resides in the provision of a regulating device for automatically varying the engine power output substantially as a preselected function of one or more engine operating conditions or other conditions affecting engine operation.

Another object is to provide a regulating device for automatically limiting the maximum engine output to a value depending on at least one variable condition affecting engine operation such as an engine operative temperature.

A further object is to provide a device for regulating the engine power output by automatically varying the engine induction or manifold pressure or the engine torque in dependence on preselected engine operating conditions and the adjustment of a manual control member.

An additional object is to provide an improved device for regulating the engine either directly from a manually adjustable control member or automatically in dependence on preselected variables.

A still further object is to provide an improved regulator for supercharged engines having a variable-speed supercharger, such for example as a supercharger driven by an exhaust gas turbine, for controlling the supercharger speed to vary the engine power output substantially as a predetermined function of preselected variables.

Other objects and advantages will be more particularly pointed out hereinafter or will become apparent as the description proceeds.

The drawings, in which there are diagrammatically illustrated suitable constructional arrangements for the purpose of disclosing the invention, are for purpose of illustration only and are not to be taken as limiting or restricting the scope of the invention.

In the drawings:

Fig. 1 is a sectional view of an engine regulator according to the invention and includes in reduced scale a diagrammatic illustration of an aircraft engine and control instrumentalities therefor.

Fig. 2 is a fragmentary modification of Fig. 1.

Figure 3:
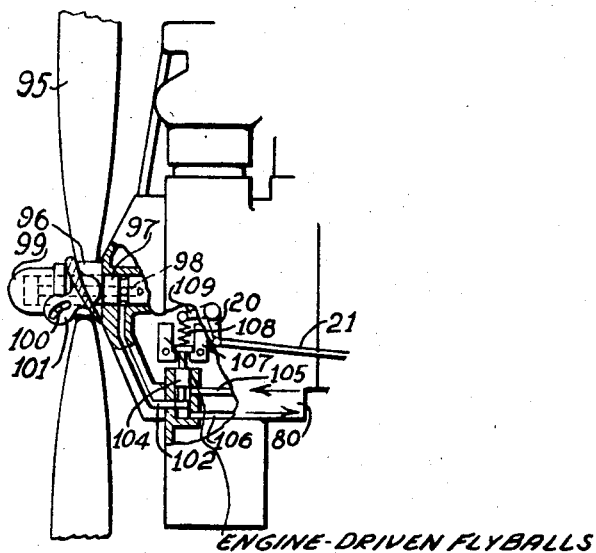

Fig. 3 diagrammatically indicates a conventional variable-pitch propeller driven by the engine of Fig. 1.

Figure 4:
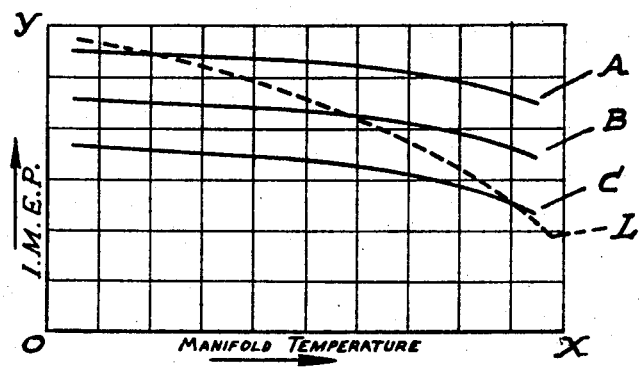

Fig. 4 is an example of engine calibration curve.

The characteristic power calibration curves of an aircraft engine, represented in Fig. 4, are referred to the axes of abscissae OX and ordinates OY representing the engine manifold temperature and the indicated mean effective pressure respectively. The values of said temperature and pressure increase in the directions indicated by the arrows.

The four curves of Fig. 4 represent the result of actual engine tests conducted with a specified fuel, at a given value of engine speed and exhaust pressure. The curve A represents the engine indicated mean effective pressure developed under a constant value of manifold pressure for different values of manifold temperature. The slope of this curve shows a reduction of indicated M.E.P. with increase in manifold temperature, which is due mainly to the corresponding reduction of density in the induction manifold. Curves B and C similarly indicate the indicated M.E.P., developed for two different lower constant values of manifold pressure. The dotted line L represents the upper limit for continuous operation, from which it is apparent that the maximum admissible value of the manifold pressure, and in turn of the indicated M.E.P., diminishes with an increase of manifold temperature.

In highly supercharged aircraft engines in which said temperature may vary within wide limits, engine regulators for limiting the maximum engine torque or manifold pressure at a constant value have the disadvantage that they either limit the engine output at an unnecessarily low value at low manifold temperature, or overload the engine at elevated temperature, or both. Accordingly, one of the objects of the present invention is to provide a device for limiting the maximum engine output, or torque, or manifold pressure, to a value varying substantially as a preselected function of the manifold temperature.

Furthermore, the upper limit for continuous operation varies upon changes of fuel characteristics and other engine operative conditions such as exhaust pressure, cylinder temperature, engine speed, surrounding atmospheric conditions. Thus a further object of the invention is to provide a regulator for varying the engine output, or the manifold pressure, or the engine torque, upon variation of one or more preselected variables such as the above.

While the curve L represents the upper limit for continuous operation, other similar curves may be determined corresponding to a maximum safe temporary engine overload, such as the upper limit for take-off power, which is also generally found to be dependent upon engine operative conditions such as manifold temperature, exhaust pressure, etc. Accordingly still another object is to provide a regulating device as outlined above, including a control member for selectively limiting the maximum engine output either at a safe value for continuous operation, or at a higher temporary value also variable upon changes of preselected variables. Furthermore the regulating device may be employed for automatically adjusting the engine torque, or output, or the manifold pressure, at values lower than those corresponding to the upper limit for continuous operation, as will be apparent from the following description.

One form of the invention is illustrated in Fig. 1 in combination with an engine such as an aircraft radial spark-ignition engine, although the invention is in no way limited in its application to any particular form or type of engine. Such engine 6 has cylinders 7 receiving air or combustible mixture from a blower or supercharger 8 by way of pipes or manifold 9 forming part of the engine induction system. Liquid fuel may be delivered to the engine by means of a carburetor or injection system, neither of which is shown in Fig. 1. The supercharger 8 is driven at variable speed by an exhaust gas turbine 10 connected by exhaust pipe 11 to the cylinder exhaust ports. The flow of exhaust gases to the turbine nozzles is regulated by a valve or blast gate 12. When the latter is rotated clockwise by means of an actuating lever 14 all exhaust gases from the engine will be delivered to the turbine, while when the valve 12 is rotated counter-clockwise the exhaust gases discharge through duct 15 and the turbine becomes inoperative. At intermediate positions of the valve 12 more or less exhaust gases will be supplied to the turbine. A control member 16 is connected with lever 14 by way of rod 17, lever 18 and rod 19 and may be employed to directly control the adjustment of valve 12 and in turn the speed of supercharger 8 and the pressure of the air or combustible mixture delivered to the engine cylinders by way of pipe or manifold 9, hereinafter referred to as manifold pressure or supercharged fluid pressure.

The engine 6 may drive a variable pitch propeller provided with a servo-motor such as a hydraulic or electric motor controlled by an engine-driven speed governor adjustable by means of lever 20, rod 21 and control member 22, for controlling said pitch thereof to automatically keep the engine speed constant at a value determined by the adjustment of member 22. In the arrangement diagrammatically indicated in Fig. 3 each of the propeller blades 95 is rotatable about a spider arm 96 attached to the propeller shaft 97. The latter has an internal chamber 98 closed by a cap 99 axially slidable on shaft 97 under hydraulic pressure supplied to the chamber 98 by way of pipe 102. The cap 99 has studs 100 which engage slots in lugs 101 carried by the blades 95. When the propeller is in operation centrifugal and aerodynamic forces tend to turn the blades 95 into maximum pitch against hydraulic pressure.

A piston valve 104 controls the admission of lubricating oil under pressure from a source, not shown, through pipes 105 and 102 to the chamber 98 and the discharge of oil from the latter through pipe 102 and an oil return pipe 106 back to the engine. The piston valve 104 is actuated by the centrifugal force of the engine-driven flyweights 107 acting against the load of spring 108 adjusted by means of lever 109 keyed to the shaft of lever 20.

Under steady flying conditions the flyweights 107 are held in equilibrium by the load of the spring 108 acting against the centrifugal force, variations in engine speed causing adjustment of the valve 104 and thus effecting changes of propeller pitch tending to maintain the engine speed substantially constant at a value corresponding to the adjustment of the governor spring 108. The speed at which the governor will automatically hold the engine may be changed by varying the angular adjustment of the speed control lever 22 connected with lever 20, thereby altering the tension of the governor spring 108. The above described mechanism including the variable-pitch propeller 95, the hydraulically actuated slidable cap 99 for regulating said pitch thereof and the pilot valve 104 actuated by resiliently-loaded, engine-driven flyballs 107 for controlling said slidable cap is well known in the art and is per se no part of the present invention.

Two temperature responsive elements 24 and 25, the former connected to the manifold 9 and responsive to the temperature of the air or combustible mixture therein, hereinafter referred to as manifold temperature or supercharged fluid temperature, and the latter responsive to the temperature of the engine cylinder, or suitable part associated therewith, or the coolant temperature in a liquid cooled engine, are connected by way of rods to the ends of lever 26 rotatably carried at an intermediate point thereof by a bell-crank lever 27 for actuating a link or rod 28. An increase of temperature of either element rotates lever 27 clockwise.

The engine regulating device, generally indicated at 29, may conveniently comprise a casing 30 having two parallel cylindrical bores therein. Within one of said bores there is disposed a reciprocable piston 31 attached to rod 32 rotatably connected with lever 18 at an intermediate point thereof. In the other bore there are mounted valve elements such as a reciprocable sleeve 34 provided with an axial cylindrical bore in which there is slidably disposed a plunger valve 35 having two spaced cylindrical discs 36 and 37 for controlling ports 38 and 39 which are formed in sleeve 34 and so arranged as to be in permanent flow communication by way of annular grooves formed in sleeve 34 and ducts 40 and 41 respectively, with the piston cylinder on either side of piston 31.

The annular chamber between discs 36 and 37 is connected by way of suitable ports and line 43 with a source of pressure fluid, usually oil from the engine pressure lubricating system, while the two portions of the sleeve bore external to discs 36 and 37 are intercommunicating by way of conduits 44 and 45, and are maintained at relatively low pressure through return line 46 leading oil back to a reservoir or engine sump. The above outlined hydraulic servo-motor is a known device, and it will be readily understood that with the valve elements in relative neutral adjustments, with ports 38 and 39 closed, as shown in Fig. 1, the piston 31 is maintained stationary. Either a displacement toward the right of plunger valve 35 or a movement to the left of sleeve 34 causes the cylinder chamber to the left of piston 31 to be connected with the oil return line 46, while oil under pressure is admitted to the other side of the piston, thus displacing the same to the left and determining clockwise rotation of lever 18 about its upper connection and counter-clockwise rotation of valve 12. Opposite rotation of valve 12 is obviously determined by displacement of plunger valve 35 toward the left or movement of sleeve 34 to the right.

The left end of plunger valve 35 is connected with a lever 48 at an intermediate point thereof, while the lower end of said lever is provided with a pin 49 cooperating with a slot 50 formed in disc 51 keyed on a shaft carrying lever 52, which is connected with the rod 28 actuated by bell crank lever 27. Thus the adjustment of the lower end of lever 48 varies as a function of the temperature of elements 24 and 25, said function depending upon the configuration of slot 50. The upper end of lever 48 is actuated by a member 54 secured to the movable walls of two diaphragm chambers or bellows 55 and 56. The former bellows is secured to the cover 53 of housing 30, and the pressure in said bellows is kept by way of pipe 57 at the same value as in the engine manifold 9, while bellows 56, provided with a calibrated spring 59 tending to expand the same, is positioned by a member 58 slidably mounted in the wall of housing 30. A lever 60, rotatably carried at an intermediate point thereof by member 58, is connected at its lower and upper ends with an adjusting member 61 and, by means of rod 62, with a manually adjustable member 63, respectively.

The adjustment of the upper end of lever 48 is thus dependent on the adjustment of member 63 and the engine manifold pressure. If the areas of bellows 55 and 56 are equal, changes of pressure within the housing 30 do not affect the adjustment of lever 48, the same being thus responsive to the absolute manifold pressure. But if one of said bellows has a larger area than the other, as shown for instance in Fig. 2, then an increase of pressure within the housing 30 will tend to contract said larger bellows, thus displacing lever 48. Moreover, if bellows 56 is not highly evacuated, but contains a substantial mass of expansible fluid, the adjustment of lever 48 will also be affected by changes of temperature within housing 30. The control member 63 may be provided with notches cooperating with a resiliently loaded detent 64. Four notches, 131 to 134, are indicated in Fig. 1.

The sleeve 34 is actuated by lever 65, which is connected at one end thereof with a rod 66 terminating in pin 67 cooperating with a slot 68 formed in speed control member 22, whereby the adjustment of sleeve 34 is dependent on the engine speed. The other end of the same lever carries a pin 70 cooperating with a slot 71 formed in rod 72 slidably mounted in a bore of housing 73 and connected with evacuated, resiliently loaded bellows 74 supported by adjustable member 75 carried by the housing cover 76 which closes the bellows chamber. The latter is maintained at exhaust pressure by means of pipe 77 connected with the engine exhaust pipe 11. Thus a change of exhaust pressure determines a corresponding displacement of the sleeve 34 dependent on the form of the slot 71.

The operation of the regulating device may be substantially as follows: assuming the control member 63 to be set at maximum power for continuous operation, with the detent 64 engaging the notch 132, control lever 16 in full open adjustment, and lever 22 set for the desired value of engine speed, the valve 12, as shown in Fig. 1, is controlled by the hydraulic servo motor to maintain the engine manifold pressure at a certain value depending on engine operative conditions as will presently be pointed out. A variation of manifold pressure, for example a drop thereof, determines contraction of bellows 55 and displacement of plunger valve 35 to the left, thus setting piston 31 in motion to rotate valve 12 clockwise and increase the speed of blower 8 and the manifold pressure until the initial value thereof is restored, whereupon bellows 55 resumes its initial position and returns plunger valve 35 to neutral adjustment relative to sleeve 34. If now the manifold temperature, or the cylinder temperature, or both vary, for instance increase, determining counterclockwise rotation of disc 51, the lower end of lever 48 and plunger valve 35 will be displaced to the right, causing counterclockwise rotation of valve 12 to reduce the supercharger speed and the manifold pressure until bellows 55 has collapsed the necessary amount to bring plunger valve 35 back to neutral position. A lower manifold pressure is thus obtained corresponding to the higher manifold and cylinder temperature; and the form of the slot 50 may be so determined that the manifold pressure varies with the manifold temperature substantially as indicated by curve L of Fig. 4. Similarly, either a variation of exhaust pressure causing expansion or contraction of bellows 74, axial displacement of rod 72 and corresponding displacement of upper end of lever 65, or a change in the adjustment of speed control lever 22 causing a corresponding displacement of the lower end of same lever, produce an axial displacement of sleeve 34 which sets piston 31 in motion to vary the manifold pressure until bellows 55 has expanded or contracted to the extent of bringing plunger 35 again to neutral adjustment relative to sleeve 34 in the new position of the latter. It is therefore clear that the manifold pressure is caused to vary as a predetermined function of manifold and cylinder or other engine operative temperature, exhaust pressure and engine speed, said function obviously depending upon the form of slots 50, 71 and 68, or cams or other equivalent devices which may be substituted for said slots.

As already stated, if bellows 55 and 56 have different effective areas, and if bellows 56 contains a substantial mass of gas, the manifold pressure becomes also dependent on the pressure and temperature within housing 30, which may be substantially the same as the surrounding atmospheric pressure and temperature.

The above automatic regulation occurs when control lever 16 is in fully open adjustment, but at any time the pilot may rotate said lever clockwise for directly actuating valve 12 to reduce the manifold pressure, and as long as the latter is below the maximum preselected value corresponding to automatic operation, bellows 55 remains contracted, with plunger 35 to the left of its neutral position and piston 31 stationary in its extreme right position, the adjustment of valve 12 being thus determined by the adjustment of control lever 16. The regulating device however stands ready to resume control as the manifold pressure attains said maximum predetermined value.

A displacement of control member 63, for example toward the left, determines a compression of bellows spring 59 or otherwise resiliently loaded bellows 56 and corresponding contraction of bellows 55 causing the valve 12 to be rotated clockwise to increase the manifold pressure until bellows 55 again expands the amount necessary to bring the plunger valve 35 back to neutral position. The regulating device will thus maintain the manifold pressure, or the engine indicated M.E.P., at higher values, which may be represented in Fig. 4 by a line substantially similar to curve L but higher than the latter. In the example shown in Fig. 1 the control member 63, which actuates lever 60 by means of rod 62, is provided with four notches 131, 132, 133 and 134 arranged to cooperate with the resilient detent 64. The adjustment illustrated, with notch 132 engaged by the detent, may correspond to maximum manifold pressure for continuous operation, while with notch 134, 133 or 131 engaged by the detent the engine manifold pressure may be automatically regulated for maximum take-off power (admissible for very short time), or temporary overload such as may be required for rapid climbing to high altitude, or cruising power, respectively. The foregoing assumes, of course, that control lever 16 is in fully open adjustment, and that the speed control member 22 is suitably set. For a given adjustment of control member 63 the engine power output may be controlled by varying the engine speed, through member 22. Furthermore, the portions of the connections between the various elements of the regulating device, such as slots 50, 71 and 68, which are effective during cruising operation, may be so designed as to automatically maintain the engine manifold pressure at values corresponding to maximum fuel economy.

Fuels of higher anti-knock rating have curves of maximum power for continuous output which are higher than line L of Fig. 4, and often have smaller slope at high manifold temperature. The regulating device of Fig. 1 may be adjusted for such fuels by means of a suitable turning adjustment of either or both members 61 and 75.

It is to be clearly understood that the invention may be applied to any suitable type of engine having any known type of supercharger, however driven, and to any type of throttle controlled engine, and that while particular mechanical embodiments have been somewhat diagrammatically illustrated, the invention is not limited thereto. It will be readily understood that regulating devices according to the present invention may be used in connection with other types of engine, such for example as compression-ignition or diesel engines, in which case they obviously will be operatively connected with fuel control means such as the control member of the fuel injection pump, for regulating the engine supply of liquid fuel, or limiting the maximum amount of such supply, in dependence upon preselected operative conditions.

Moreover, it is to be expressly understood that the invention may be used in various ways, and that various modifications, substitutions, additions and omissions may be resorted to in the character, construction, arrangement and manner of operation and number of the various elements and parts within the limits or scope of the invention as defined in the appended claims.

In interpreting said claims, where they are directed to less than all of the elements of the complete system disclosed, they are to be construed as covering possible uses of the recited elements in installations which lack the non-recited elements.

I claim:

1. In a speed and temperature control system for use with an internal combustion engine having in series flow relation an air compressor, a combustion chamber and a gas turbine connected to drive said compressor; and including a power member driven by said engine under variable speed and load conditions; the combination comprising first regulating means responsive to the speed of said power member for controlling the load applied thereto, second regulating means responsive to an operating temperature of the engine resulting from combustion for controlling the supply of actuating gas to said turbine, a control lever operatively connected to said first and second regulating means for simultaneously selecting various values of said temperature and speed, and surrounding temperature and atmospheric pressure responsive means effective to limit the maximum value of said temperature that may be selected as a predetermined function of said atmospheric pressure and surrounding temperature.

2. In a speed and temperature control system for use with an internal combustion powerplant having a member driven by the powerplant under variable speed and load conditions and including in series flow relation an air compressor, a combustion chamber and a gas turbine connected to drive said compressor, the combination comprising first regulating means responsive to the speed of said member for controlling the load applied thereto, second regulating means responsive to an engine operating temperature resulting from combustion for controlling the supply of actuating gas to said turbine, means for changing the datum of said first and second regulating means, a control lever for operating said datum changing means to select various values of said temperature and speed, and ambient temperature responsive means and means responsive to the pressure on the discharge side of said compressor operatively connected to said second regulating means to alter the operation thereof as a preselected function of said ambient temperature and compressor discharge pressure.

3. In a speed and temperature control system for use with an internal combustion powerplant having a member driven by the powerplant under variable speed and load conditions and including in series flow relation an air intake system with a compressor therein, a combustion chamber and a gas discharge system with a turbine therein connected to drive said compressor, the combination comprising first regulating means responsive to the speed of said member for controlling the load applied to said member to regulate the speed thereof, second regulating means including means responsive to an operating temperature of the powerplant resulting from combustion for controlling the rate of supply of actuating gas to said turbine to regulate said temperature, means for changing the datum of said first and second regulating means, a control lever for operating said datum changing means to select various values of said speed and temperature, and means responsive to the pressure in said gas discharge system upstream from said gas turbine and means responsive to variations of the surrounding barometric pressure for altering the datum of the second regulating means to vary the selected temperature independently of said control lever.

4. In apparatus for controlling the speed and temperature of an internal combustion powerplant driving a variable pitch propeller and including in series flow relation an air compressor, a combustion chamber and a gas turbine connected to drive said compressor at speed independent of the speed of said propeller, the combination comprising first regulating means for controlling the pitch of said propeller to regulate the speed of the powerplant, second regulating means including a device responsive to an operating temperature of the powerplant varying with the speed of said gas turbine and air compressor for controlling the pressure differential across said gas turbine to maintain said temperature substantially at a selected value, means for varying the datum of said first and second regulating means, a control member operatively connected to actuate said datum varying means to select various values of said powerplant speed and temperature, and additional control means for varying the datum of said second regulating means without altering the datum of the first regulating means.

5. In a temperature and speed control system for an internal combustion powerplant driving a power shaft and including, in series flow relation, an air compressor, a combustion chamber and a gas turbine connected to drive said compressor; the combination with variable exhaust opening means for controlling said gas turbine, of a mechanism for varying said opening means, first regulating means connected to said mechanism and responsive to a powerplant temperature condition dependent upon the adjustment of said variable exhaust opening means for actuating said mechanism to maintain the powerplant at a selected temperature, second regulating means including speed governing means sensing variations in the speed of said power shaft for regulating the load applied thereto, and common control means operatively connected with said first and second regulating means for varying the datum thereof.

6. In a speed and temperature control system for an aircraft engine driving a variable pitch propeller and including in series flow relation an air compressor, a combustion chamber and a gas turbine connected to drive said compressor, the combination comprising an adjustable engine-driven governor for controlling the blade angle of the propeller to maintain the propeller speed at the selected value, a servo mechanism for controlling the speed of said gas turbine, servo control means for controlling said servo mechanism, a plurality of sensor devices operatively connected to actuate said servo control means including means responsive to an operating engine temperature resulting from combustion for regulating the turbine speed to maintain said engine temperature substantially at a selected value, means responsive to the compressor discharge pressure operatively connected with said temperature responsive means for varying the effect thereof to modify said engine temperature as a predetermined function of compressor discharge pressure, means responsive to variations of surrounding air temperature operatively connected to said first mentioned temperature responsive means for altering the effect thereof to modify said engine temperature as a preselected function of said surrounding temperature, common manually operable control means operatively connected to said governor and to said servo mechanism for altering the datum of said governor and servo mechanism to select various combinations of propeller speed and said engine operating temperature according to a predetermined schedule, and additional control means operating upon said servo mechanism for altering said speed-temperature schedule without varying the propeller speed.

7. In a speed and temperature control system for an internal combustion engine including a turbo-compressor and driving a power shaft subject to a controllable load, the combination with an adjustable engine-driven governor for regulating the load on the power shaft to maintain the shaft speed at a selected value, of a servomechanism for controlling the speed of the turbo-compressor, means responsive to an operating temperature of the engine which varies with the speed of the turbo-compressor, an operative connection for actuating said servo mechanism from said temperature responsive means to regulate the speed of the turbo-compressor so as to maintain said engine temperature substantially at a selected value, common control means for varying the datum of said governor and the datum of said servo mechanism to modify the shaft speed and said engine temperature so as to produce various combinations of said speed and temperature according to a predetermined schedule, and means responsive to changes of surrounding air pressure and temperature operatively connected with said servo mechanism for altering the effect of said engine temperature responsive means to modify said engine temperature as a preselected function of said surrounding air pressure and temperature.

8. In a speed and temperature control system for an internal combustion engine driving a power shaft subject to a controllable load and including in series flow relation an air compressor, a combustion chamber and a gas turbine for driving said compressor, the combination with a speed governor for regulating the load on said power shaft to control the shaft speed, of a servo mechanism for regulating the supply of actuating gas to said gas turbine, means responsive to an engine operating temperature resulting from combustion for actuating said servo mechanism to maintain said engine temperature substantially at a selected value, a common manually operable control member for varying the datum of both said governor and servo mechanism to select various values of shaft speed and engine temperature in accordance with the setting of said control member, and additional control means for varying the datum of said servo mechanism to change the engine temperature obtainable for a given setting of said control member without altering the shaft speed.

9. For use with an internal combustion engine driving a power member subject to controllable load and having in series flow relation an air compressor, a combustion chamber and a gas turbine driving said compressor, a speed and temperature control system including an adjustable governor responsive to the speed of said power member for regulating the load on said member to control the speed thereof, a regulating device for controlling the supply of actuating gas to said turbine, means responsive to an operative temperature of the engine resulting from combustion for controlling said regulating device to keep said temperature substantially at a selected value, a common control member for varying the datum of said governor and altering the operative setting of said temperature responsive means to select various values of said speed and temperature, and additional means responsive to variations of surrounding temperature for altering the operative setting of the first mentioned temperature responsive means as a preselected function of the surrounding air temperature.

10. In a speed and temperature control system for an internal combustion engine driving a power member under controllable load and having in series flow relation an air compressor, a combustion chamber and a gas turbine driving said compressor, the combination with a governor responsive to the speed of said power member for regulating the load on said power member to control the speed thereof, of a turbine regulator for varying the supply of actuating gas to said gas turbine, means responsive to an operating temperature of the engine varying with the supply of said actuating substance to the turbine, an operative connection for actuating said turbine regulator from said temperature responsive means to keep said temperature substantially at a selected value, a common control member for varying the datum of said governor and the operative setting of said temperature responsive means to select various values of said speed and temperature, and additional means responsive to surrounding air pressure variations for altering the operative setting of said temperature responsive means in predetermined relation to said air pressure.

References Cited in the file of this patent

UNITED STATES PATENTS

| | | |
|---|---|---|
| 1,476,418 | Rice | Dec. 4, 1923 |
| 2,024,202 | Berger | Dec. 17, 1935 |
| 2,088,954 | Gregg | Aug. 3, 1937 |
| 2,217,364 | Halford et al. | Oct. 8, 1940 |
| 2,219,994 | Jung | Oct. 29, 1940 |
| 2,306,953 | Jung | Dec. 29, 1942 |
| 2,336,844 | Buck | Dec. 14, 1943 |
| 2,373,139 | Morris | Apr. 10, 1945 |
| 2,480,621 | Warner | Aug. 30, 1949 |

FOREIGN PATENTS

| | | |
|---|---|---|
| 231,156 | Great Britain | Sept. 10, 1926 |
| 458,350 | Great Britain | Dec. 17, 1936 |